United States Patent
Griffin et al.

(10) Patent No.: US 11,429,475 B1
(45) Date of Patent: *Aug. 30, 2022

(54) SYSTEMS AND METHODS FOR BLOCKCHAIN REPAIR ASSURANCE TOKENS

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/991,212

(22) Filed: Aug. 12, 2020

Related U.S. Application Data

(63) Continuation of application No. 16/031,520, filed on Jul. 10, 2018, now Pat. No. 10,747,609.

(51) Int. Cl.
  *G06F 11/00* (2006.01)
  *G06F 11/07* (2006.01)
  *H04L 9/32* (2006.01)

(52) U.S. Cl.
  CPC ...... *G06F 11/0793* (2013.01); *G06F 11/0745* (2013.01); *G06F 11/0751* (2013.01); *H04L 9/3247* (2013.01); *H04L 9/3297* (2013.01)

(58) Field of Classification Search
  CPC ............. G06F 11/0793; G06F 11/0745; G06F 11/0751; H04L 9/3247; H04L 9/3297
  See application file for complete search history.

(56) References Cited

U.S. PATENT DOCUMENTS

| | | | |
|---|---|---|---|
| 5,841,866 A | 11/1998 | Bruwer et al. | |
| 8,438,392 B2 | 5/2013 | Oxford | |
| 8,914,633 B1* | 12/2014 | Cook | H04L 63/126 713/168 |
| 9,148,285 B2 | 9/2015 | Chang et al. | |
| 9,594,922 B1* | 3/2017 | McGuire | H04L 9/0891 |
| 9,998,286 B1 | 6/2018 | Ramathal et al. | |
| 10,361,853 B2 | 7/2019 | Castagna et al. | |
| 10,404,469 B2 | 9/2019 | Madhavan et al. | |
| 10,476,665 B1 | 11/2019 | Griffin et al. | |
| 2007/0067833 A1* | 3/2007 | Colnot | H04L 63/10 726/9 |
| 2009/0228564 A1* | 9/2009 | Hamburg | G06Q 10/107 709/206 |
| 2017/0012978 A1* | 1/2017 | Lin | H04L 63/0884 |
| 2018/0254982 A1 | 9/2018 | Apostolopoulos et al. | |

OTHER PUBLICATIONS

Greenspan, Gideon; "The Blockchain Immutability Myth", https://www.coindesk.com/blockchain-immutability-myth/, May 9, 2017. 8 pages.

* cited by examiner

*Primary Examiner* — Esaw T Abraham
(74) *Attorney, Agent, or Firm* — Foley & Lardner LLP

(57) ABSTRACT

Systems, methods, and apparatuses of creating a repair token for a distributed ledger are provided. A method includes identifying an error in the distributed ledger, the error associated with a first block on the distributed ledger, creating a repair token including content of the first block and a correction to the error, digitally signing and time-stamping the repair token, and publishing the repair token to a repair token ledger.

20 Claims, 5 Drawing Sheets

SYSTEMS AND METHODS FOR BLOCKCHAIN REPAIR ASSURANCE TOKENS

CROSS REFERENCE TO RELATED APPLICATIONS

This application is a continuation of U.S. Pat. No. 10,747,609, titled "Systems and Methods for Blockchain Repair Assurance Tokens," filed on Jul. 10, 2018, which is incorporated herein by reference in its entirety and for all purposes.

TECHNICAL FIELD

The present application relates generally to systems and methods for distributed ledgers.

BACKGROUND

A distributed ledger, such as a blockchain, is a series of signed, hash-linked, append-only, timestamped blocks, each block containing arbitrary data. When viewed as a linked-list data structure, a blockchain is a limited data "stack" whose operations only allow users to "push" blocks onto the top. Users are not allowed to modify blocks or to "pull" blocks from the blockchain. Each new block that is added is appended to the topmost block in the stack. A new block links back to the former top-of-stack block by including a hash (e.g., a smaller mathematical representation) of the preceding block in the new block and binding this hash to the new block.

SUMMARY

One embodiment relates to a method of creating a repair token for a distributed ledger. The method includes identifying an error in the distributed ledger, the error associated with a first block on the distributed ledger, creating a repair token including content of the first block and a correction to the error, digitally signing and timestamping the repair token, and publishing the repair token to a repair token ledger.

Another embodiment relates to a system of creating a repair token for a distributed ledger. The system includes a processor and a non-transitory machine readable medium with instructions stored thereon. When executed by the processor, the instructions cause the system to identify an error in the distributed ledger, the error associated with a first block on the distributed ledger, create a repair token including content of the first block and a correction to the error, digitally sign and timestamp the repair token, and publish the repair token to a repair token ledger.

Another embodiment relates to a method of creating a repair token for a distributed ledger. The method includes identifying an erroneous transaction included in a first block on the distributed ledger and creating a repair token. The repair token includes content of the first block, a correction transaction correcting the erroneous transaction, a pointer to a second block preceding the first block on the distributed ledger so as to provide a backward link between the first block and the second block on the distributed ledger, a pointer to a third block following the first block on the distributed ledger so as to provide a forward link between the first block and the second block, and one or more digital signatures of one or more parties to the erroneous transaction, thereby confirming the correction transaction. The method further includes digitally signing an timestamping the repair token and publishing the repair token to a repair token ledger.

DETAILED DESCRIPTION

Figure 1:
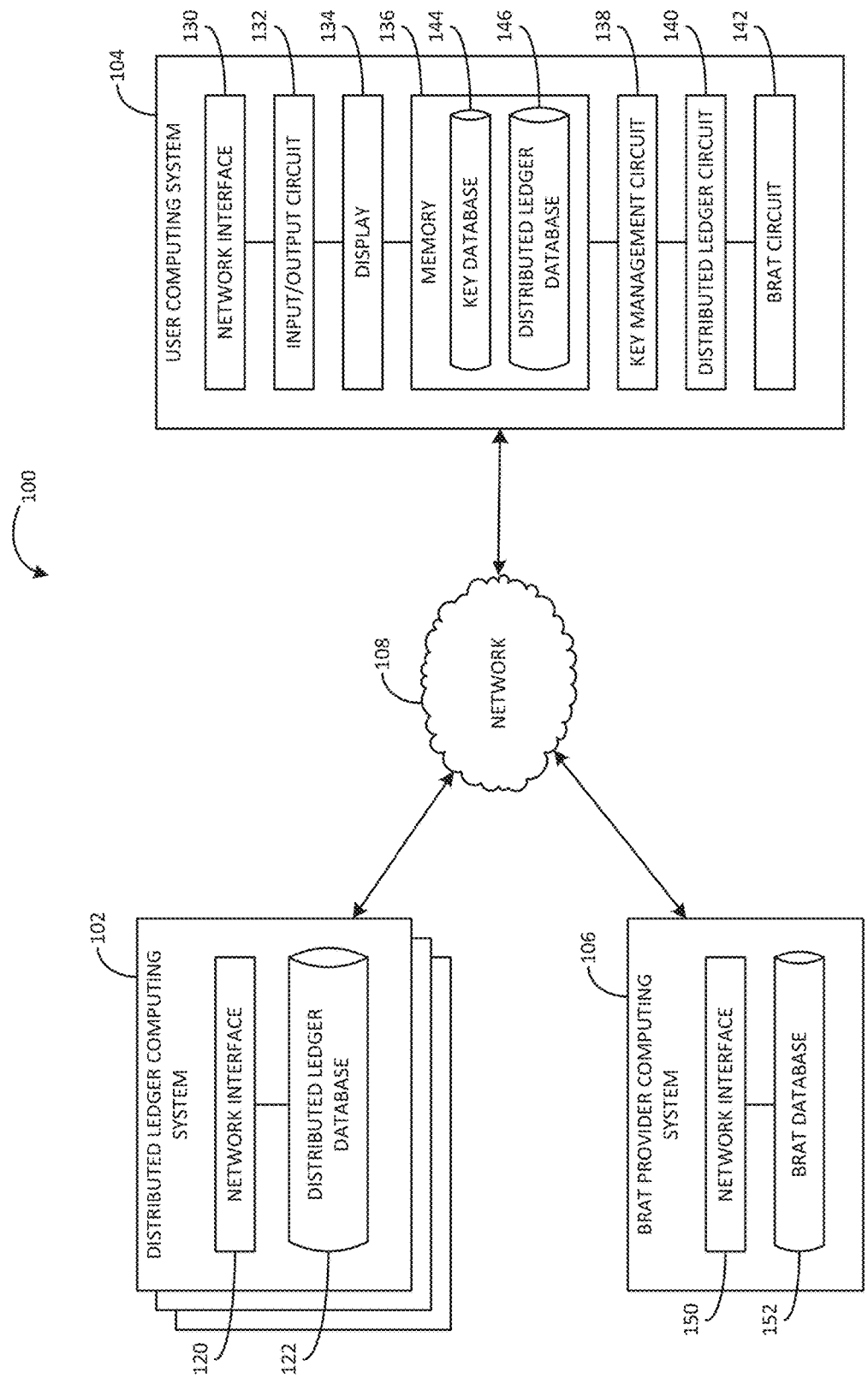
FIG. 1 is an environmental view of a system implementing a blockchain repair assurance token, according to one embodiment.

Referring to the figures generally, various systems, methods, and apparatuses for blockchain repair assurance tokens are described herein. An example implementation is described as follows. A distributed ledger, such as a blockchain, may include one or more errors, such as erroneous or incorrect transactions and/or bifurcations. Because distributed ledgers are write-once and read-many technologies, if an error is determined, it cannot be easily corrected. The linked hash values of the distributed ledger deter changes based on infeasible computational capabilities. As such, a record may be published in a separate ledger and used to repair errors. Such a record is referred to herein as a blockchain repair assurance token ("BRAT"). It should be understood that while the BRAT is defined with reference to a blockchain, the BRAT may be equally applied to other types of distributed ledgers. The BRAT record essentially replaces the original erroneous block by replicating the original block content and including transactional corrections. The BRAT record further points backwards to the previous block and forwards to the next block within the distributed ledger. In this way, by providing a replacement token for a block that includes, for example, an erroneous transaction or a bifurcation, the BRAT record may be used to repair errors on the distributed ledger.

The present systems and methods for providing BRATs provide a number of technical advantages over prior art systems and methods. To begin with, a transactional error on a distributed ledger requires subsequent faux transactions to fix, and reconciling balances across disparate blocks may be difficult. For example, if a blockchain records that User A pays User B $20, User B may use the $20 to pay User C and User D each $10 via the blockchain. However, if it is discovered that the original transaction was erroneous and User A only paid User B $18, the original and subsequent transactions would need to be corrected through subsequent transactions. As an illustration, an amendment transaction for User B to pay User A back the $2 would correct User A's balance, but the $2 amendments would leave User B with a negative balance. To correct the negative balance, a second amendment transaction for User C and User D to each pay User B back $1 would need to be implemented. Furthermore, the amendment transactions may be located in different positions from the original transactions. As an example, the original transaction may occur in block 347, the amendment transaction between User A and User B may occur in block 622, and the amendment transaction between User B, User C, and User D may occur in block 831. Accordingly, the disparate locations of amendment transactions may make reconciling balances or auditing transactions difficult.

Similarly, a bifurcation error requires the determination of which path is correct. As an example, two new blocks may be posted that both link back to the same previous block, causing a bifurcation in the blockchain. Per the blockchain rules of engagement, the side of the bifurcation confirmed by the majority (e.g., a majority of the computing nodes processing the transaction) is determined to be the correct side of the chain, causing the other side of the chain to be eventually abandoned. However, because the blockchain is immutable, both chain fragments still exist on the blockchain. Accordingly, validating a blockchain with abandoned fragments is problematic and difficult.

The present systems and methods for providing BRATs represent a technical solution over these issues because a BRAT record corrects an error in a distributed ledger without affecting the immutability of the distributed ledger itself. For example, in the case of an erroneous transaction on a block, the BRAT record replicates the block, corrects the transaction, and points to the blocks occurring before and after the erroneous block. Additionally, in some arrangements, the BRAT record points to or contains a record of subsequent transactions used to fix the erroneous block. As such, an entity looking at one or more transactions including the erroneous transaction (e.g., an auditor confirming transactions) can easily see the corrections to the erroneous block and/or find subsequent blocks used to correct the erroneous block using the BRAT. As another example, in the case of a bifurcation, the BRAT points to the correct chain such that entity looking at a series of blocks including the bifurcation can easily follow the correct chain of transactions. Accordingly, BRAT records simplify the process of reconciling balances, auditing transactions, and validating chains. In turn, this improves the functioning of computing systems used in distributed ledger transactions, as an entity posting a follow-up transaction to a distributed ledger or verifying a series of transactions on a distributed ledger does not need to sort through the entire distributed ledger in order to, for example, verify that a transaction of interest is valid or that a particular chain is the correct chain. Instead, the BRAT record may be consulted to determine if any corrections have been made to the transaction(s) of interest, which speeds up the process of posting or verifying transactions and frees up the processors and bandwidth of a computing system for other activities.

Referring now to FIG. 1, an environmental view of a BRAT system 100 is shown, according to an example embodiment. The system 100 includes one or more distributed ledger computing systems 102, a user computing system 104, and a BRAT provider computing system 106. As shown, the components of the system 100 are connected by a network (e.g., secure network 110).

The one or more distributed ledger computing systems 102 are associated with the distributed ledger for which the BRAT provider computing system 106 stores BRAT records. For example, the one or more distributed ledger computing systems may be or include a central computer network storing the distributed ledger, computer nodes verifying transactions posted to the distributed ledger, computer nodes posting transactions to the distributed ledger, and so on. In various embodiments, the distributed ledger may be a permissionless or a permissioned ledger. If permissionless, the one or more distributed ledger computing systems 102 may include any computing system capable of downloading transactions posted to, verifying transactions posted to, and/or posting transactions to the distributed ledger. If permissioned, the one or more computing systems 102 may be associated with one or more trusted entities given access to the distributed ledger for the purposes of posting transactions and verifying transactions posted to the distributed ledger. In some embodiments, the distributed ledger computing system 102 may further be a single computing system, for example, trusted to verify and maintain a distributed ledger.

As shown in FIG. 1, the one or more distributed ledger computing systems 102 each include at least a network interface 120 and a distributed ledger database 122. The network interface 120 is adapted for and configured to establish a communication session via the network 108 with other components of the system 100. As used herein, a "network interface" may include any of a cellular transceiver (Code Division Multiple Access ("CDMA"), Global System for Mobile Communications ("GSM"), Long-Term Evolution ("LTE"), etc.), a wireless network transceiver (e.g., 802.11X, ZigBee, Bluetooth, etc.), and a combination thereof (e.g., both a cellular transceiver and a Bluetooth transceiver). The distributed ledger database 122 is configured to retrievably store information relating to the distributed ledger. Accordingly, the distributed ledger database 122 may store the entirety or part of a distributed ledger, for example, downloaded from a central computing system or from other distributed ledger computing systems 102. It should be understood, however, that in some embodiments, the one or more distributed ledger computing systems 102 may include components in addition to the network interface 120 and the distributed ledger database 122. As an illustration, a given distributed ledger computing system 102 may include an input/output circuit, a display, etc.

The user computing system 104 is associated with a user creating a BRAT for the distributed ledger associated with the one or more distributed ledger computing systems 102. For example, in some embodiments, the user computing system 104 may be affiliated with a user who identifies an error in a block and/or a bifurcation in a distributed ledger and creates a BRAT to correct the error and/or point to the correct chain after the bifurcation. Additionally, in certain embodiments, the user computing system 104 may include multiple computing systems, each affiliated with at least a part of an error on the distributed ledger. The multiple computing systems may together create a BRAT to fix the error, the process of which is described in further detail below. Alternatively, in other embodiments, the system 100 may not include the user computing system 104. Instead, the BRAT provider computing system 106 may perform the functions of the user computing system 104. For example, the BRAT provider computing system 106 may monitor the distributed ledger for errors such as erroneous transactions (e.g., based on subsequent blocks posted to fix the erroneous transactions) and/or for bifurcations (e.g., based on abandoned, alternate sections of the distributed ledger). The BRAT provider computing system 106 may then automatically create BRAT records to fix the erroneous transactions and/or point to the correct chains after the bifurcations.

As shown in FIG. 1, the user computing system 104 includes a network interface 130, an input/output circuit 132, a display 134, a memory 136, a key management circuit 138, a distributed ledger circuit 140, and a BRAT circuit 142. In various embodiments, the network interface 130 of the user computing system 104 is configured similarly to the network interface 120 (e.g., the network interface 130 is adapted for and configured to establish a communication session via the network 108 with other components of the system 100).

The input/output circuit 132 is structured to receive from and provide communications to a user of the user computing system 104. In this regard, the input/output circuit 132 is structured to exchange data, communications, instructions, etc. with input/output components of the user computing system 104. As such, the input/output circuit 132 may include hardware and associated logics configured to enable the user computing system 104 to exchange information with the user. In certain embodiments, an input aspect of the input/output circuit 132 may allow the user to provide information to the user computing system 104, and an output of the input/output circuit 132 may allow the user to receive information from the user computing system 104.

In various embodiments, the display 134 may be a screen, a touchscreen, a monitor, etc. The user computing system 104 may use the display 134 to communicate information to the user (e.g., by displaying the information to the user on the display 134) and/or to receive communications from the user (e.g., through a keyboard provided on a touchscreen of the display 134). In some embodiments, the display 134 may be incorporated as part of the input/output circuit 132, while in other embodiments, the display 134 may be separate from the input/output circuit 132.

As shown in FIG. 1, the memory 136 is communicably and operatively coupled with the other components of the user computing system 104. The memory includes a key database 144 and a distributed ledger database 146. The key database 144 is configured to retrievably store cryptographic keys for the user computing system 104. In various arrangements, cryptographic techniques require a user to possess a pair of cryptographic keys: a public key and a private key. Each public/private key pair is selected such that a message encrypted with one of the keys can only be decrypted with the other key in the key pair. In general, a public key is made public, or generally accessible and available to the public (e.g., in an X.509 certificate), while a private key is kept private to the owner of the public/private key pair. Among other things, public/private key pairs may be used to digitally sign content. As an illustration, a relying party wanting to certify that a message has been created by the owner of the public/private key pair may use a digital signature algorithm that produces, using the message and the party's private key, a digital signature associated with the party. Further, the owner of a key pair may have a digital certificate (e.g., an X.509 certificate) that includes information about the owner's public key and a digital signature of an authoritative entity (e.g., an issuing certificate authority) that has verified the certificate's contents such that the relying party may use the certificate to verify ownership of the public key. As an illustration, the relying party can verify the owner's digital signature on the message by using a signature verifying algorithm, the digital signature, and the owner's public key (which the relying party retrieves from the owner's digital certificate). As such, in various embodiments, the key database 144 is configured to retrievably store the public/private keys and digital certificate for the user associated with the user computing system 104.

Additionally, in various embodiments, the distributed ledger database 146 is configured similarly to the distributed ledger database 122. As such, the distributed ledger database 146 is configured to retrievably store information relating to the distributed ledger. For example, the distributed ledger database 146 may store the entirety or part of a distributed ledger downloaded from the one or more distributed ledger computing systems 102.

The key management circuit 138 is configured to manage the public/private key pair for the user. For example, in some embodiments, the key management circuit 138 is configured to create a public/private key pair for the user, ensure the generation of a certificate for the public key by a certifying authority, and retrievably store the public/private key pair and certificate in the key database 144. Alternatively, in some embodiments, the key management circuit 138 may be structured to communicate with an enterprise key management system that remotely generates and provisions public/private key pairs to the user computing system 104.

The distributed ledger circuit 140 is configured to manage the operations of the user computing system 104 with respect to the distributed ledger. Accordingly, the distributed ledger circuit 140 is configured to communicate with the one or more distributed ledger computing systems 102, for example, to download the entirety or part of the distributed ledger to the distributed ledger database 146. In some arrangements, the distributed ledger circuit 140 may be further configured to scan the distributed ledger, for example, for transactions related to an erroneous transaction or for bifurcations in the distributed ledger.

The BRAT circuit 142 is configured to create BRAT records relating to errors in the distributed ledger, such as blocks containing erroneous transactions or bifurcations in the distributed ledger where only one of the bifurcation chains includes the correct record of transactions. Accordingly, when an error is identified (e.g., manually by the user or automatically by the distributed ledger circuit 140), the BRAT circuit 142 is configured to create a BRAT record to address the error and retrievably store the BRAT with the BRAT provider computing system 106, as described in further detail below. The BRAT circuit 142 may be configured to create the BRAT with at least some to no feedback from the user. For example, in one arrangement, the user may identify an error in the distributed ledger, and the BRAT circuit 142 may automatically create the BRAT correcting the error. In another arrangement, the user may identify an error in the distributed ledger, and manually provide information to or via the BRAT circuit 142 to create the BRAT correcting the error. Alternatively, in some embodiments, a BRAT record may be created by another entity (e.g., an authorized entity), and the user may be or be associated with a party to one or more transactions that the BRAT record is created to correct. Accordingly, in such embodiments, the BRAT circuit 142 may be configured to digitally sign the create BRAT to verify that the user approves of the correction included in the BRAT.

Although in FIG. 1, the BRAT circuit 142 is shown as provided by the user computing system 104, in other arrangements, the BRAT circuit 142 may be at least partially provided by the BRAT provider computing system 106. For example, the user computing system 104 may identify an error in the distributed ledger to the BRAT provider computing system 106, and the BRAT provider computing system 106 may create the BRAT to correct the error. As another example, the user computing system 104 may interface with the BRAT provider computing system 106 (e.g., via the network interface 130) to access functionalities provided by the BRAT provider computing system 106 for creating the BRAT.

The BRAT provider computing system 106 is associated with a provider of BRAT services. For example, the BRAT provider may be a financial institution, associated with the distributed ledger computing system, or a third party. In some embodiments, and as discussed above, the BRAT provider computing system 106 may include some or all of the functionalities of the user computing system 104.

As shown in FIG. 1, the BRAT provider computing system 106 includes a network interface 150 and a BRAT database 152. In various embodiments, the network interface 150 is configured similarly to the network interface 120 (e.g., the network interface 150 is adapted for and configured to establish a communication session via the network 108 with other components of the system 100). The BRAT database 152 is configured to retrievably store various BRATs relating to the distributed ledger of the one or more distributed ledger computing systems 102. In some embodiments, the BRATs stored in the BRAT database 152 are created by various user computing systems (e.g., the user computing system 104). Alternatively, or additionally, BRATs stored in the BRAT database 152 may be automatically created by the BRAT provider computing system 106 (e.g., in response to BRAT provider computing system 106 identifying blocks of the distributed ledger created to fix erroneous transactions, in response to identifying bifurcations in the distributed ledger, etc.).

Each BRAT stored in the BRAT database 152 may include or be stored in association with information identifying the BRAT's corresponding block (e.g., the block the BRAT is created to correct) in the distributed ledger. For example, each BRAT may include or be stored in association with a hash of the content of the corresponding block such that a user may identify that the block has a corresponding BRAT stored in the BRAT database 152 using a hash of the block's content. As another example, each BRAT may include or be stored in association with a block identifier for the corresponding block such that a user may identify that the block has a corresponding BRAT stored in the BRAT database 152 using the corresponding block's identifier.

In some arrangements, the BRAT database 152 is accessible to all of the users of the distributed ledger such that anyone able to post new blocks to and/or read posted blocks from the distributed ledger is able to check the BRAT ledger recorded in the BRAT database 152 to verify transactions and/or chains on the distributed ledger. In other arrangements, the BRAT database 152 is only accessible to a subset of the distributed ledger users. For example, the BRAT provider computing system 106 may offer access to the BRAT database 152 to customers of the BRAT provider computing system 106 (e.g., as a feature of being an existing customer of the BRAT provider computing system, on a subscription basis, etc.). Moreover, the BRAT database 152 may vary between implementations. For example, the BRAT database 152 may be provided as a separate database as shown in FIG. 1 (e.g., similar to a certificate revocation list), may be provided as part of a separated distributed ledger, may be posted as a block on the distributed ledger, etc.

Additionally, users able to access the BRAT database 152 may have varying levels of access to the BRATs stored therein. For example, in some arrangements, users able to access the BRAT database 152 may manually peruse the BRAT database 152 to identify BRATs stored therein. In other arrangements, users able to access the BRAT database 152 may only identify BRATs stored therein by providing information about a block on the distributed ledger to the BRAT provider computing system 106 (e.g., a hash of block's content or the block's identifier), based upon which the BRAT provider computing system 106 identifies whether a corresponding BRAT is stored in the BRAT database 152.

Figure 2:
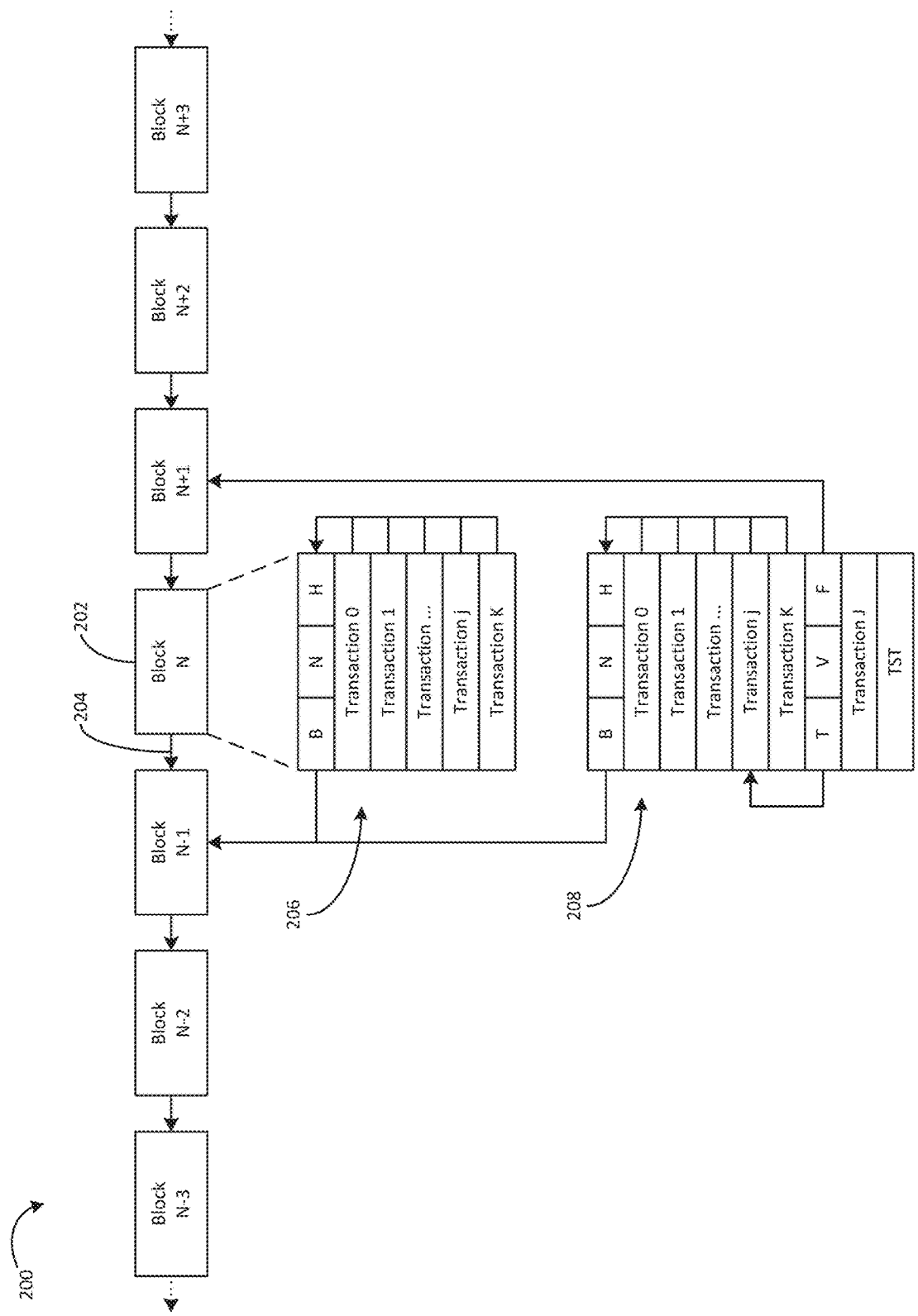
FIG. 2 is a block diagram of an implementation of a blockchain repair assurance token, according to one embodiment.

Referring now to FIG. 2, a block diagram of an implementation of a BRAT is shown, according to an example embodiment. As shown in FIG. 2, a distributed ledger 200 includes a number of blocks 202, with each block 202 including a hash-link 204 to the previous block 202 in the distributed ledger 200. In the example of FIG. 2, block N includes an erroneous transaction. As such, FIG. 2 includes a detailed view 206 of block N. As shown in the detailed view 206, block N includes a series of transactions 0 through K, where "Transaction j" is the erroneous transaction. Block N also includes a backwards pointer (represented by the "B" section of the detailed view 206), such as a hash of the content of block N−1; a block number (represented by the "N" section of the detailed view 206); and a hash of the transactions 0 through K (represented by the "H" section of the detailed view 206).

To correct the erroneous Transaction j, a BRAT 208 has been created (e.g., created by the user computing system 104 and stored in the BRAT database 152). The BRAT 208 replicates block N, and as such, the BRAT includes transactions 0 through K, the backwards pointer B, the block number N, and the transaction hash H. In addition, the BRAT 208 includes a "Transaction J," which is the corrected version of Transaction j. The corrected Transaction J points back to the erroneous Transaction j through a transaction link (represented by the "T" section of the BRAT 208), which may, for example, be a hash of the erroneous Transaction j. The BRAT 208 further includes a block version (represented by the "V" section of the BRAT 208) and a forwards pointer (represented by the "F" section of the BRAT 208). The forwards pointer F indicates the subsequent block in the distributed ledger 200 (e.g., for block N, block N+1) and may be, for example, a hash of the content of block N+1. Finally, the BRAT 208 includes a time stamp token (represented by the "TST" section of the BRAT 208) that indicates the time the BRAT 208 was created.

Accordingly, by using the BRAT 208, an entity needing to authenticate the transactions 0 through K on block N, use transactions 0 through K for further transactions, etc. is able to easily identify the erroneous Transaction j and the corrected version of Transaction J. The entity is also able to determine the time the BRAT 208 was created through the time stamp token, as well as identify where the BRAT 208 fits on the distributed ledger 200 through the backwards pointer B and the forwards pointer F.

It should be understood, however, that in other embodiments, the BRAT 208 may include additional or different components. For example, in some embodiments, if one or more additional blocks 202 have been added to the distributed ledger 200 to correct Transaction j on the distributed ledger 200, the BRAT 208 may include pointers to those correcting blocks 202. In other embodiments, the BRAT 208 may include a field for the digital signatures of one or more parties to Transaction J, with the digital signatures of the one or more parties verifying that they approve of Transaction j being corrected by Transaction J in the BRAT 208. In still other embodiments, the BRAT 208 may include additional or different pointers than hashes of the content of interest. For example, the corrected Transaction J may point back to the Transaction j through a digital signature, a reference number for Transaction j, etc.

Figure 3:
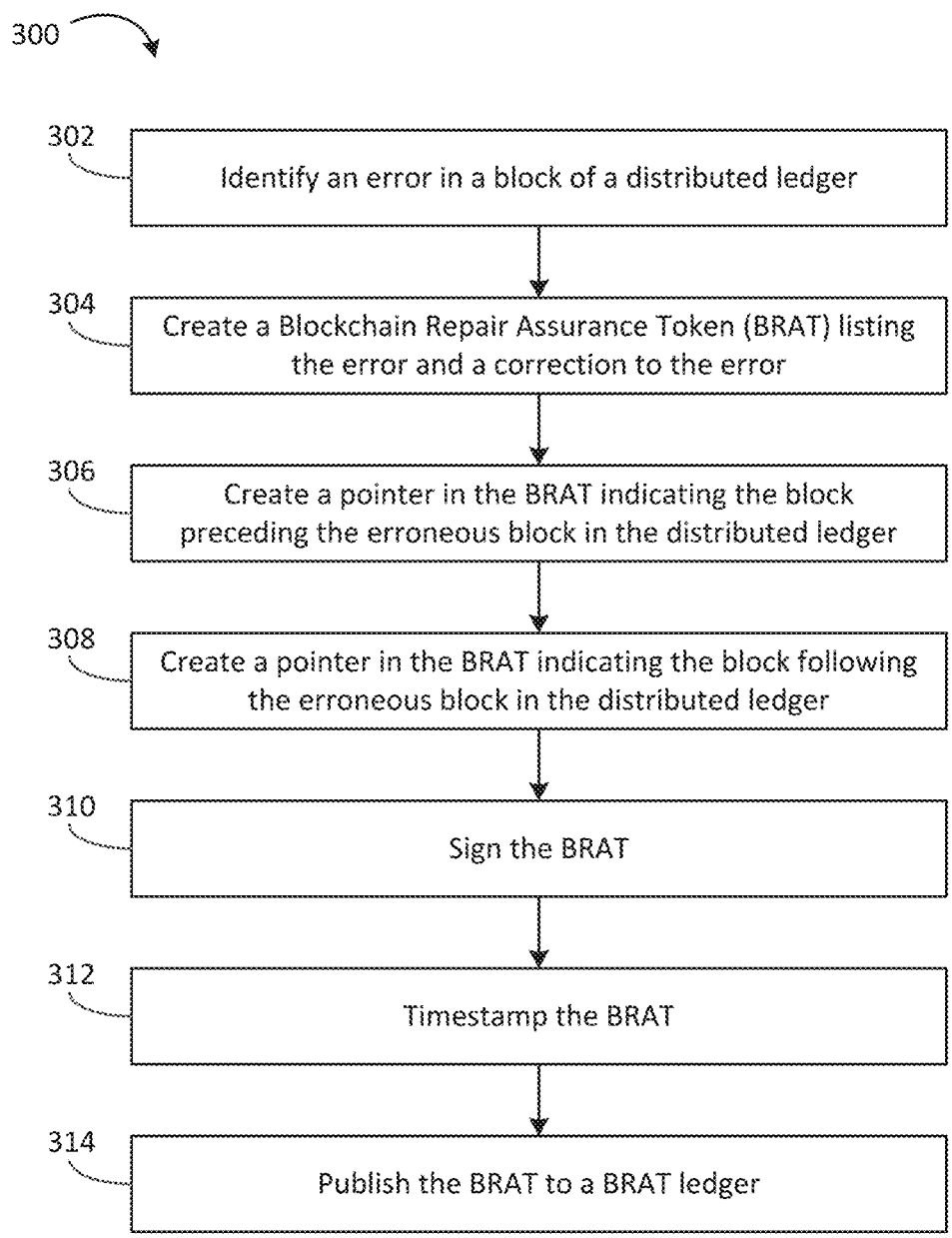
FIG. 3 is a flow diagram showing a process of implementing a blockchain repair assurance token, according to one embodiment.

Referring now to FIG. 3, a flow diagram of a method 300 of implementing a BRAT, such as the BRAT 208, is shown according to an example embodiment. At step 302, an error, such as an incorrect or erroneous transaction, is identified in a block of a distributed ledger. In various arrangements, the error may be identified manually (e.g., by a user) or automatically (e.g., by the user computing system 104). For example, an error may be identified automatically based on a computing system unsuccessfully verifying transactions on the distributed ledger, identifying one or more subsequent blocks that correct the erroneous transaction, etc.

At step 304, a BRAT is created listing the error and a correction to the error. In various arrangements, the BRAT may be formatted similarly to the BRAT 208, discussed above. As with step 302, in various arrangements, the BRAT creation may occur manually or automatically. As an illustration, a user may create a BRAT in response to the user computing system 104 identifying an error in a block of the distributed ledger. As another illustration, the user computing system 104 may create a BRAT based on a transaction found in a subsequent block on the distributed ledger and used to correct the error. At step 306, a pointer is created in the BRAT indicating the block preceding the erroneous block in the distributed ledger (e.g., the block to which the erroneous block is hash-linked back). In various arrangements, the pointer may be a hash of the content of the preceding block, an indication of the block number of the previous block, etc. Similarly, at step 308, a pointer is created in the BRAT indicating the block following the erroneous block in the distributed ledger (e.g., the block that hash-links back to the erroneous block).

At step 310, the BRAT is digitally signed (e.g., using a private key corresponding to a public key published in an X.509 certificate). For example, the BRAT is digitally signed by an entity authorized to manage BRAT records. The signing entity may be the same entity that created the BRAT or may be a separate entity that approves a BRAT created by another (e.g., the authorized entity approves of BRATs submitted by various users). At step 312, the BRAT is timestamped. As an example, the digital signature of the BRAT is validated using a TST issued from a Time Stamp Authority ("TSA"). Accordingly, once an authorized entity has generated the BRAT content and digitally signed the BRAT content using its private key, the authorized entity submits a hash of the signed BRAT content to the TSA and affixes the TST to the BRAT content.

Finally, at step 314, the BRAT is published to a BRAT ledger. In various embodiments, the BRAT ledger may be included in a block on the distributed ledger, as a separate database that entities can check to identify whether blocks on a distributed ledger are still valid or include updates (e.g., similar to a certificate revocation list), etc. In certain embodiments, the BRAT ledger may be implemented as a separate distributed ledger such that publishing the BRAT to the BRAT ledger includes posting the BRAT as a block on the separate BRAT distributed ledger.

It should be understood, however, that method 300 is intended to be exemplary. In other embodiments, the method of creating and publishing a BRAT to fix an erroneous transaction may include different and/or additional steps. For example, another embodiment may include creating one or more pointers indicating subsequent blocks added to the distributed ledger to fix the error in the erroneous block. As another example, another embodiment may include having the parties to the erroneous transaction, or entities representing those parties (e.g., auditors), sign the BRAT to confirm the corrections included in the BRAT. The parties may sign the correction as part of a trusted timestamp token (e.g., a signed data field in the token), or the parties may sign the correction before it is posted, with the timestamp capturing the agreement. Furthermore, the BRAT may include a specific field for these confirmation signatures of parties to the transaction.

Figure 4:
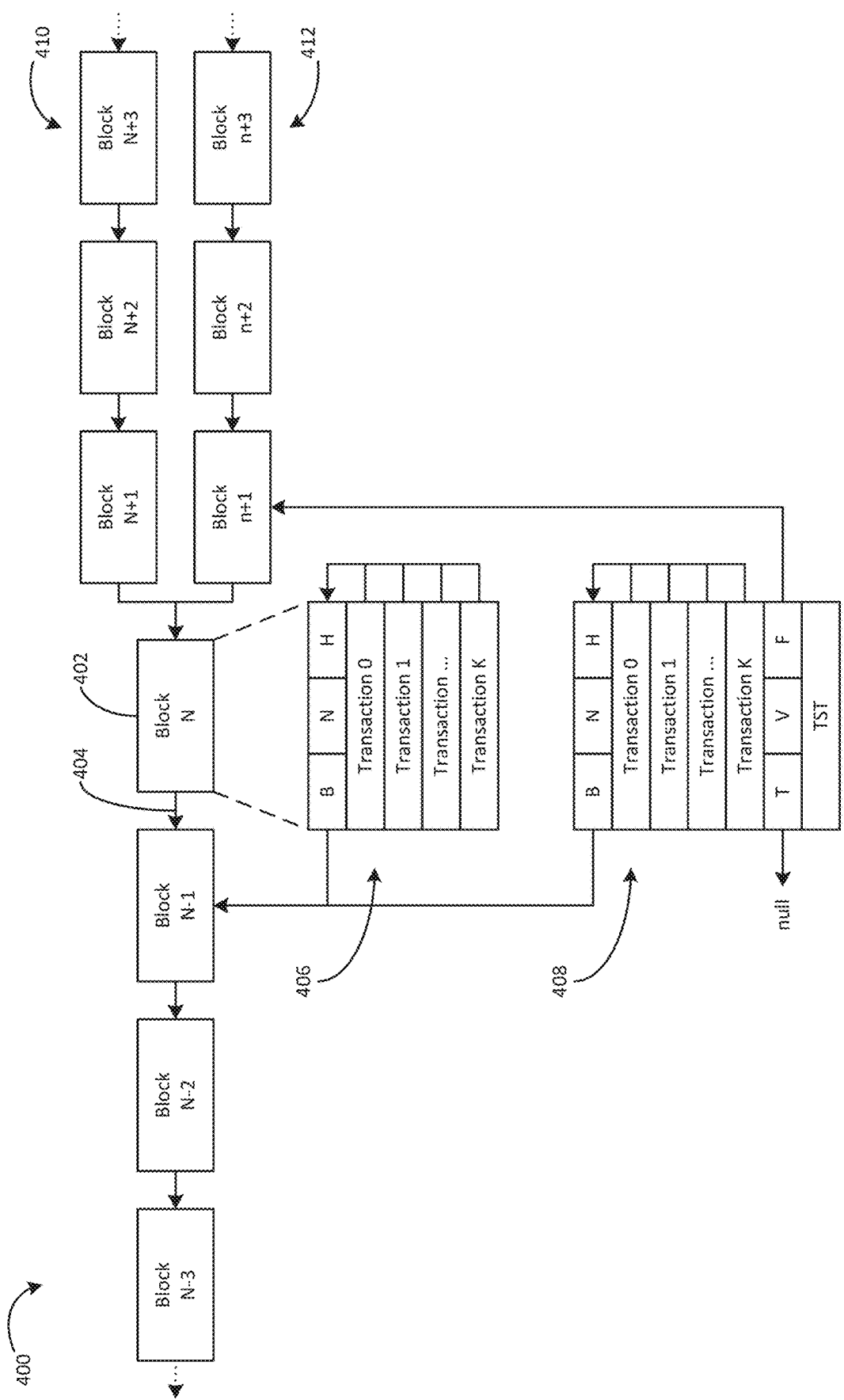
FIG. 4 is a block diagram of an implementation of a blockchain repair assurance token, according to a second embodiment.

Referring now to FIG. 4, a block diagram of another implementation of a BRAT is shown, according to an example embodiment. As shown in FIG. 4, and similar to the distributed ledger 200 shown in FIG. 2, a distributed ledger 400 includes a number of blocks 402, with each block 402 including a hash-link 404 to the previous block 402 in the distributed ledger 400. However, the distributed ledger 400 also includes a bifurcation after block N, splitting into a first, incorrect chain 410 (e.g., designated as "N+x" blocks) and a second, correct chain 412 (e.g., designated as "n+x" blocks). For example, incorrect processing of a transaction in the block following block N on the distributed ledger 400 may have caused the bifurcation.

Although the computing system or systems processing the distributed ledger 400 may eventually abandon chain 410 as incorrect, an observer looking at the portion of the distributed ledger 400 shown in FIG. 4 would have initial difficulty in determining whether chain 410 or chain 412 is correct. As such, a BRAT 408 has been created (e.g., created by the user computing system 104 and stored in the BRAT database 152) to indicate that chain 412 is the correct continuation of the distributed ledger 400. Because the bifurcation occurs at block N, the BRAT 408 replicates block N. As shown in a detailed view 406 of block N, block N includes a series of transactions 0 through K. Block N also includes a backwards pointer (represented by the "B" section of the detailed view 406), such as a hash of the content of block N−1; a block number (represented by the "N" section of the detailed view 406); and a hash of the transactions 0 through K (represented by the "H" section of the detailed view 406). As the BRAT 408 replicates block N, the BRAT 408 also includes transactions 0 through K, the backwards pointer B, the block number N, and the transaction hash H.

In addition, similar to the BRAT 208, the BRAT 408 includes a transaction link (represented by the "T" section of the BRAT 408), a block version (represented by the "V" section of the BRAT 408), and a forwards pointer (represented by the "F" section of the BRAT 408). In FIG. 4, the BRAT 408 is not being used to correct an erroneous transaction, so the transaction link T points to null. The forwards pointer F, however, is used to point to the correct next block in the distributed ledger 400, namely, block n+1. As such, by using the BRAT 408, an entity can identify whether chain 410 or chain 412 is the correct continuation of the distributed ledger 400 by finding the bifurcation point (e.g., block N), checking the BRAT ledger to find the BRAT 408 corresponding to block N, and using the forwards pointer F of the BRAT 408 to identify that chain 412 is the correct chain.

It should be understood, however, that like the BRAT 208, the BRAT 408 may include additional or different components in other embodiments. For example, the BRAT 408 may include the signatures of one or more parties involved in the transaction(s) of block n+1 in order to verify that the parties confirm that block n+1 is the correct continuation of the distributed ledger 400. As another example, the BRAT 408 may include fields and/or pointers to various blocks of chain 410 such that an individual may, for instance, find otherwise valid transactions that had been applied to the incorrect chain 410 and may need to be reapplied to the correct chain 412. As yet another example, the BRAT 408 may include additional or different pointers than hashes of the content of interest, such as pointers implemented through digital signatures, reference numbers, etc.

Figure 5:
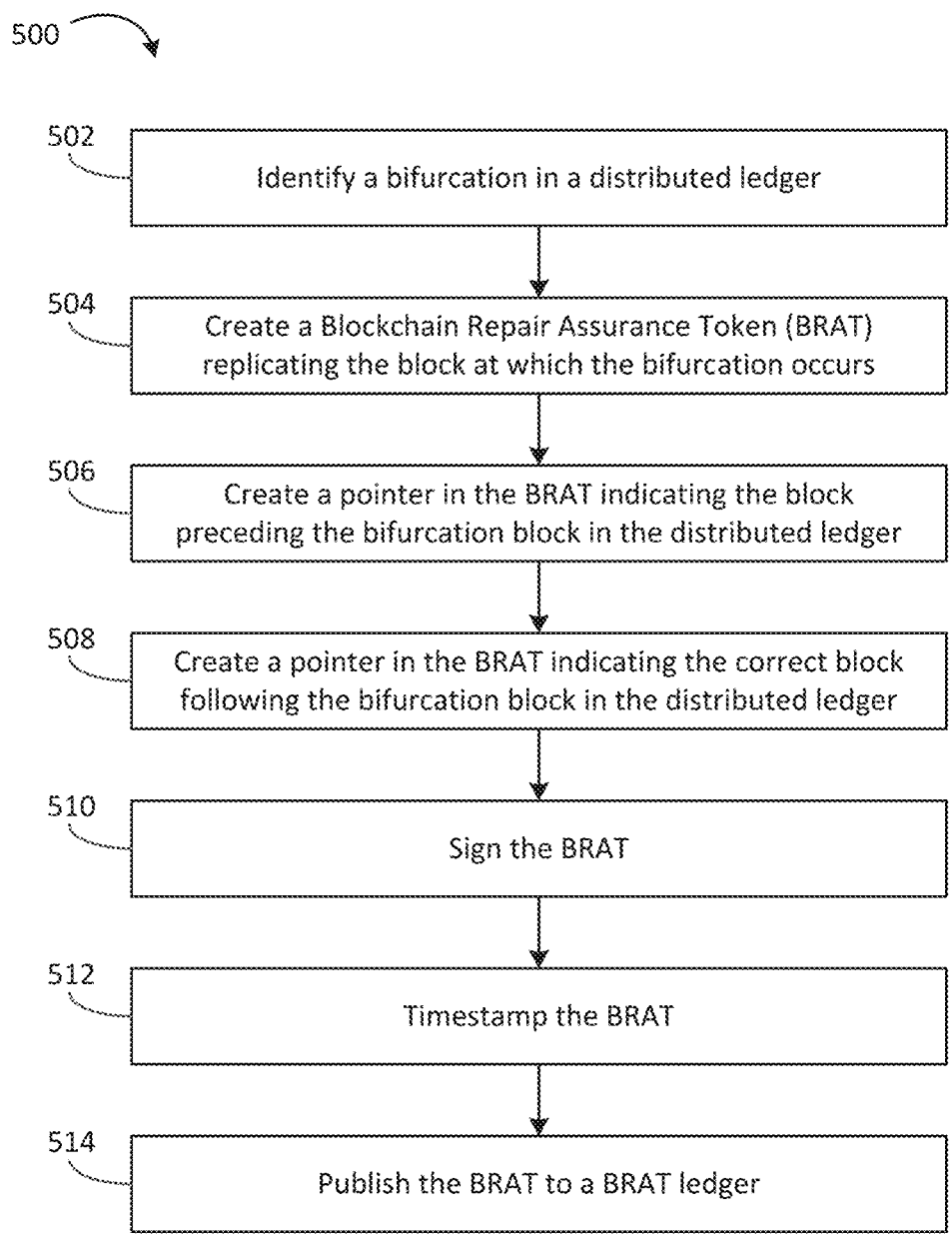
FIG. 5 is a flow diagram showing a process of implementing the blockchain repair assurance token of FIG. 4, according to one embodiment.

Referring now to FIG. 5, a flow diagram of a method 500 of implementing a BRAT, such as BRAT 408, is shown according to another example embodiment. At step 502, a bifurcation is identified in a distributed ledger. In various arrangements, and similar to step 302 of method 300, the bifurcation may be identified manually (e.g., by a user) or automatically (e.g., by the user computing system 104). For example, a bifurcation may be identified automatically based on a computing system determining that a given block of the distributed ledger has two or more blocks that are hash-linked back to the given block.

At step 504, a BRAT is created replicating the block at which the bifurcation occurs (e.g., block N in FIG. 4). In various arrangements, the BRAT may be formatted similarly to the BRAT 408, discussed above. Additionally, in various arrangements and similar to step 304 of method 300, the creation of the BRAT may occur manually or automatically. As an illustration, a user may create a BRAT in response to the user computing system 104 identifying a bifurcation in the distributed ledger. As another illustration, the user computing system 104 may create a BRAT by determining that a bifurcation in the distributed ledger has occurred and identifying the correct continuation chain as a chain of the bifurcation that has been continued and not abandoned. At step 506, a pointer is created in the BRAT indicating the block preceding the bifurcation block (e.g., the block to which the bifurcation block hash-links back). In various arrangements, the pointer may be a hash of the content of the preceding block, an indication of the block number of the previous block, etc. Furthermore, at step 508, a pointer is created in the BRAT indicating the correct block that follows the bifurcation block in the distributed ledger (e.g., the block on the correct chain that hash-links back to the bifurcation block).

At step 510, the BRAT is digitally signed, and at step 512, the BRAT is timestamped. Finally, at step 514, the BRAT is published to a BRAT ledger. These processes may occur similarly to steps 310, 312, and 314 of method 300, discussed above with reference to FIG. 3. It should be understood, however, that method 500 is intended to be exemplary, and in other embodiments, the method of creating and publishing a BRAT to indicate the correct chain in a bifurcation of a distributed ledger may include different and/or additional steps. For example, another embodiment may include having the parties to the transaction(s) following the bifurcation sign the BRAT to confirm that the chain pointed to by the BRAT is the correct chain.

Additionally, those of skill in the art will understand that FIGS. 2-5 present examples of BRAT implementations. Further implementations of BRATs are contemplated herein. As an example, a BRAT may be used to correct an invalid or corrupt block identified in a distributed ledger. The BRAT may be created to replace the invalid or corrupt block, pointing to the blocks preceding and following the replaced block, such that an entity verifying the transactions on the distributed ledger can use the BRAT in place of the invalid or corrupt block.

As another example, a BRAT including multiple corrections to multiple blocks of a distributed ledger may be implemented. Furthermore, in some arrangements, such a BRAT may be implemented as a block on a distributed ledger. A new BRAT may be included on the distributed ledger at regular intervals (e.g., every N blocks) such that an entity wanting to verify whether correction transactions have been posted to the distributed ledger for a given block need look at certain blocks of the distributed ledger to find the corrections. Alternatively, or additionally, a separate ledger may list the locations of all of the BRATs on the distributed ledger.

As yet another example, a BRAT may be implemented as a transaction repair token that collects missing, abandoned, and orphaned transactions that are otherwise valid but may, for instance, have been applied to an abandoned chain of the distributed ledger. The BRAT identifies these otherwise valid transactions (e.g., such that the timestamps of the blocks including these transactions are preserved) and/or applies them correctly to the non-abandoned chain of the distributed ledger.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include machine or computer-readable media that are executable by one or more processors (e.g., multiple remote processors connected to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 108) includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 108. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of creating a repair token for a distributed ledger, comprising:
    identifying, via a computing system, an error in the distributed ledger, the error associated with a first block on the distributed ledger;
    creating, via the computing system, a repair token comprising content of the first block and a correction to the error;

digitally signing and timestamping, via the computing system, the repair token; and publishing, via the computing system, the repair token to a repair token ledger.

2. The method of claim 1, wherein the repair token further comprises a pointer to a second block preceding the first block on the distributed ledger, the pointer providing a backward link between the first block and the second block on the distributed ledger.

3. The method of claim 1, wherein the error is a bifurcation in the distributed ledger occurring after the first block, the bifurcation comprising a correct chain and one or more incorrect chains, and wherein the correction includes a pointer to a fourth block on the correct chain, the fourth block being hash-linked back to the first block on the distributed ledger.

4. The method of claim 1, wherein the error is an erroneous transaction in the first block, the erroneous transaction being between at least two parties, wherein the correction comprises a correction transaction correcting the erroneous transaction, and wherein the repair token further comprises one or more digital signatures of one or more of the at least two parties to the erroneous transaction, the one or more digital signatures confirming the correction transaction in the repair token.

5. The method of claim 4, wherein the distributed ledger further comprises a third block comprising the correction transaction and following the first block on the distributed ledger; and wherein the repair token further comprises a pointer to the third block.

6. The method of claim 1, wherein the error is a properly verified transaction in the first block, the first block located on an abandoned chain of the distributed ledger, and wherein the correction includes a pointer to a fifth block on a non-abandoned chain of the distributed ledger.

7. The method of claim 6, wherein the fifth block comprises the properly verified transaction of the first block.

8. The method of claim 1, wherein timestamping the repair token comprises creating a time stamp token (TST) and including the TST in the repair token.

9. The method of claim 1, wherein the repair token ledger is implemented as a separate database.

10. The method of claim 9, further comprising restricting access to the separate database to users of the computing system.

11. A system of creating a repair token for a distributed ledger, comprising:

a processor; and a non-transitory machine readable medium with instructions stored thereon that, when executed by the processor, cause the system to:

identify an error in the distributed ledger, the error associated with a first block on the distributed ledger;

create a repair token comprising content of the first block and a correction to the error;

digitally sign and timestamp the repair token; and publish the repair token to a repair token ledger.

12. The system of claim 11, wherein the error is a properly verified transaction in the first block, the first block located on an abandoned chain of the distributed ledger, and wherein the correction includes a pointer to a fifth block on a non-abandoned chain of the distributed ledger.

13. The system of claim 12, wherein the fifth block comprises the properly verified transaction of the first block.

14. The system of claim 11, wherein timestamping the repair token comprises creating a time stamp token (TST) and including the TST in the repair token.

15. The system of claim 11, wherein the repair token ledger is implemented as a separate database.

16. The system of claim 15, further comprising restricting access to the separate database to users of the distributed ledger.

17. A method of creating a repair token for a distributed ledger, comprising:

identifying, via a computing system, an error in the distributed ledger, the error associated with a first block on the distributed ledger;

creating, via the computing system, a repair token comprising content of the first block and a correction to the error;

digitally signing and timestamping, via the computing system, the repair token;

publishing, via the computing system, the repair token to a repair token database; and restricting access to the repair token database to users of the computing system.

18. The method of claim 17, wherein the repair token database is implemented as a separate distributed ledger, and wherein the repair token is published as a block on the separate distributed ledger.

19. The method of claim 17, wherein the repair token database is posted as a block on the distributed ledger.

20. The method of claim 19, wherein the repair token database block is posted on the distributed ledger at regular intervals.

* * * * *